United States Patent [19]
Iriyama

[11] Patent Number: 5,732,599
[45] Date of Patent: Mar. 31, 1998

[54] INDUSTRIAL ROBOT

[75] Inventor: Yoshiko Iriyama, Tokyo, Japan

[73] Assignee: Tokico Ltd., Kanagawa-ken

[21] Appl. No.: 696,403

[22] Filed: Aug. 14, 1996

[30] Foreign Application Priority Data

Aug. 18, 1995 [JP] Japan ................................. 7-210825

[51] Int. Cl.$^6$ ........................... B25J 17/00; B25J 18/00
[52] U.S. Cl. ..................... 74/490.02; 901/23; 901/28; 901/43
[58] Field of Search ................. 74/490.02; 901/23, 901/24, 25, 28, 43

[56] References Cited

U.S. PATENT DOCUMENTS

| | | | |
|---|---|---|---|
| 4,732,526 | 3/1988 | Nakashima et al. | 901/23 X |
| 4,738,576 | 4/1988 | Eberle et al. | 901/23 X |
| 5,375,480 | 12/1994 | Nihei et al. | 901/23 X |
| 5,606,235 | 2/1997 | Mauletti | 901/23 X |

Primary Examiner—Allan D. Herrmann
Attorney, Agent, or Firm—Pearne, Gordon, McCoy & Granger LLP

[57] ABSTRACT

A robotic device having at least first and second arms joined with an elbow-joint is relatively maintenance-free and is particularly suitable for use in an atmosphere full of vapors from paints or organic solvents. These substances pose considerable operational problems in conventional robotic devices because of the accumulation of dust and solvents, which causes not only degradation in the performance of the robot but requires high maintenance cost. These problems are solved in the present robotic device by housing the driving motor for the second arm within the confines of the cross sectional area of the first arm, and the second arm is coupled through a connector to the output shaft of the driving motor, again within the same confined area. Such a compact design includes side caps providing protection of the feed-through cables and wires, which are routed out of the first shaft inner space to loop around the elbow-joint to enter into the second shaft inner space. The protection caps are sealed against the side walls of the first shaft to guard the cables and wires from the organic vapors in the operating atmosphere while allowing a wide degree of freedom of movement of the second arm and preventing inertial loading on the second arm which is should be free to perform quick and complex maneuvers. The sealing material may either be labyrinth-type seal or a felt material seal which permits sliding against the arms.

21 Claims, 5 Drawing Sheets

INDUSTRIAL ROBOT

BACKGROUND OF THE INVENTION

1. Field of the Invention

The present invention relates in general to industrial robots, and relates in particular to a robotic device suitable for use as a painting or sealing robot operating in an environment where there is a high likelihood of paints, sealing material or cleaning fluids adhering to the cables.

2. Description of the Related Art

Articulating joints in conventional robotic devices have been designed so that the joint comprises an assembly of a groove portion of a first arm coupling to a protrusion portion of a second arm such that they can be rotated about their respective shaft connections.

Most of the connecting electric cables for controlling the actions of driving motors for the arms and signal wires for sensors for the detection of arm orientation are housed within the interior spaces of the respective shafts; however, to avoid sharp bends in the cables and wires at the joint, the cables and wires exit from the interior of the arm shaft prior to the joint and brought into the interior space of the other arm shaft after passing over the joint section.

When a device having such a configuration is used in production, it is inevitable that paints and sealing media together with dust particles adhere to the exposed portion of the electrical cables and wires, thus leading to operational problems such as hardening of the cable sheath and dissolution of the electrical insulation material by solvents. Such problems are solved on-site by the operator of the robot through such means as wrapping the cables with a spiral tape.

The problem with this approach is that, continued operation of the robot, over a period of time, causes coatings to be repeatedly deposited on the exposed areas and hardened, thus leading to a lamination of hard materials. Ultimately, it means that excessive force must be applied to operate the joint.

To prevent such a situation from developing, it is necessary to periodically remove the old spiral tape wrapping when a certain amount of deposit is formed, and install a new tape wrapping. However, it is not always a simple process to determine when the wrapping should be exchanged, and proper timing is usually left to the experience of the operator and individual judgment for the maintenance need. Furthermore, stopping of the robotic device for such maintenance tasks causes the entire assembly line to stop, thus leading to lowering in the productively of the overall assembly operation.

SUMMARY OF THE INVENTION

It is an object of the present invention to provide an articulating elbow joint of a simple but effective design for an industrial robotic device to prevent adhesion of dust and vapor materials from paints and solvents on the cables and wires exposed to the vapor atmosphere.

The object is achieved in a robotic means comprising a freely rotatable first arm having an electrical driving means disposed at one end for driving a second arm which is freely rotatably coupled to the first arm; wherein the electrical driving means is supported in a drive housing protrudingly disposed on the one end so as to occupy a portion of a transverse cross sectional area of the first arm, and the second arm is coupled to an output shaft of the electrical driving means through a coupling means protrudingly disposed on another end of the second arm so as to occupy a portion of a transverse cross sectional area of the second arm. This configuration offers a simpler design of the elbow joint compared with the conventional designs of the elbow joints, because the driving motor is supported at one end of the first arm within the transverse cross section of the first arm by means of a first flange while the second arm is coupled to the driving motor through a second flange which is also located within the confines of the cross sectional area of the first arm. The design enables the cables and wires to be completely guarded from the organic vapors, and yet permits the cables and wires to be routed out of the interior spaces of the first and second arms into the outer space for a greater range of motion of the robotic device compared to the conventional case of clamping the wires and cables within the interior spaces of the first and second arms. Therefore, the cables are subjected to lesser degrees of stress compared with the conventional elbow joints, thus permitting a wider range of operating angles for the second arm.

An aspect of the robotic device is that the covers are supported on the first arm, and a seal member is used between the cover member and the second arm. The cables and wires are guarded by the cover members from the operating environment, thereby protecting them from the degrading effects caused by the adhesion of organic solvents leading to dissolution and hardening of the sheath. The service life of the cables and wires have thus been increased compared with the conventional designs.

Another aspect of the robotic device is that the cover members are attached to the first arm which is located closer to the base section of the robotic device, i.e., the lower member of the first and second arm members. This means that the increase in the inertial mass of the system to be driven is borne by the driving motor which provides power to the base section which is located below the elbow section of the robotic device, thus relieving the driving motor located above the elbow joint of the loading effects of the excess loading factor. Because the cover members are separate from the arms, the cover members can be removed readily for maintenance purposes to clean any hardened deposit. If the cover members need to be changed, the maintenance steps are simple and quick thereby enabling to improve the productivity compared with the conventional elbow-joint designs.

Another aspect of the robotic device is that the sealing member can be a labyrinth packing to prevent an increase in the friction between first arm and second arm.

A final aspect of the robotic device is that the sealing member can be a felt material fixedly disposed on the first arm so as to minimize degradation in the sealing performance even when the robotic device is used in an atmosphere filled with vapors from paints and organic solvents.

DESCRIPTION OF THE PREFERRED EMBODIMENTS

Preferred embodiments will be explained with reference to FIGS. 1–4.

Figure 1:
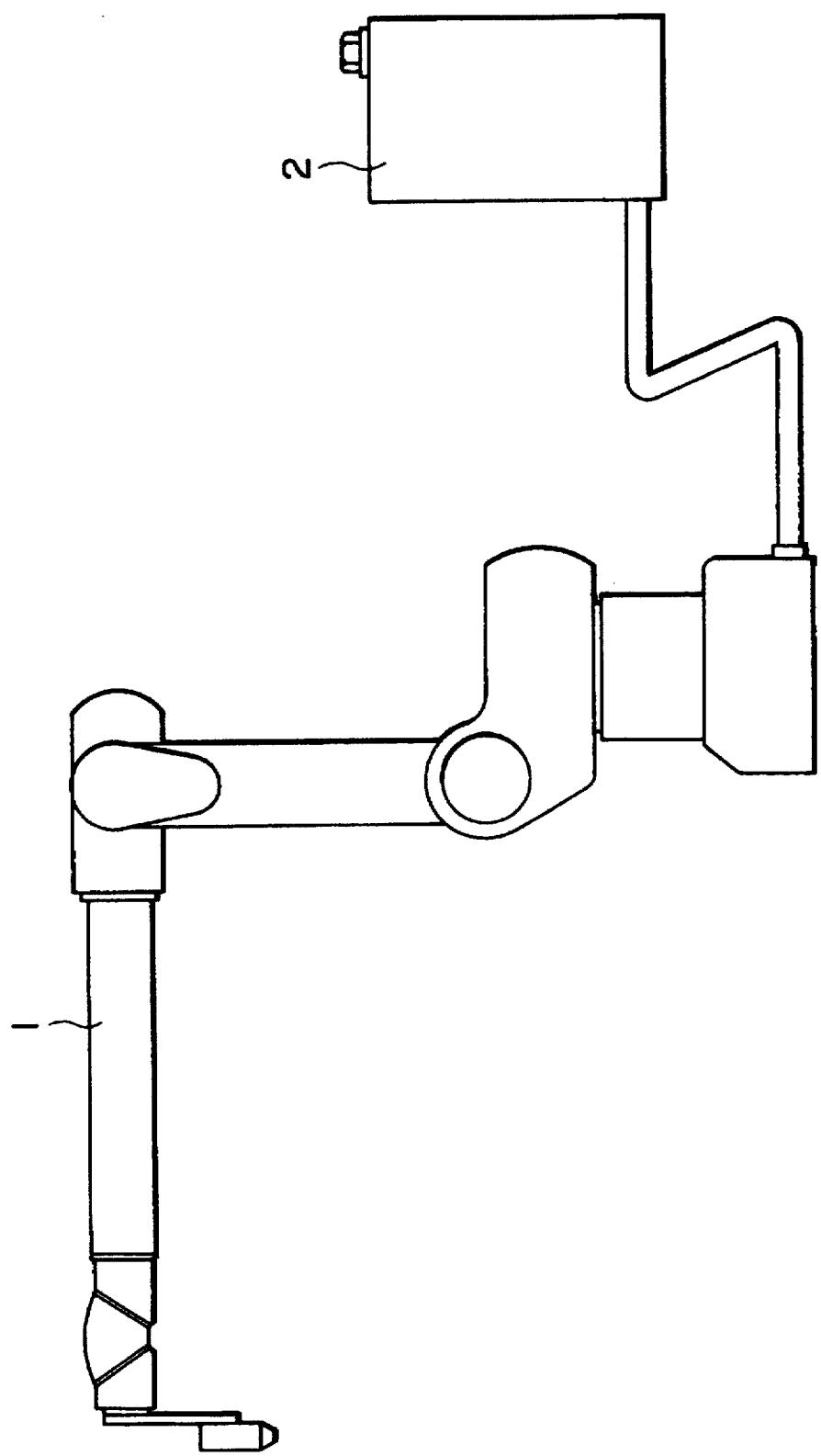
FIG. 1 is an overall side view of a first embodiment of the robotic device of the present invention.

The overall configuration of a first painting robotic device will be explained with reference to FIGS. 1 and 2.

The robotic device comprises a manipulator body 1 and a controller 2 which controls the operation of the manipulator 1.

Figure 2:
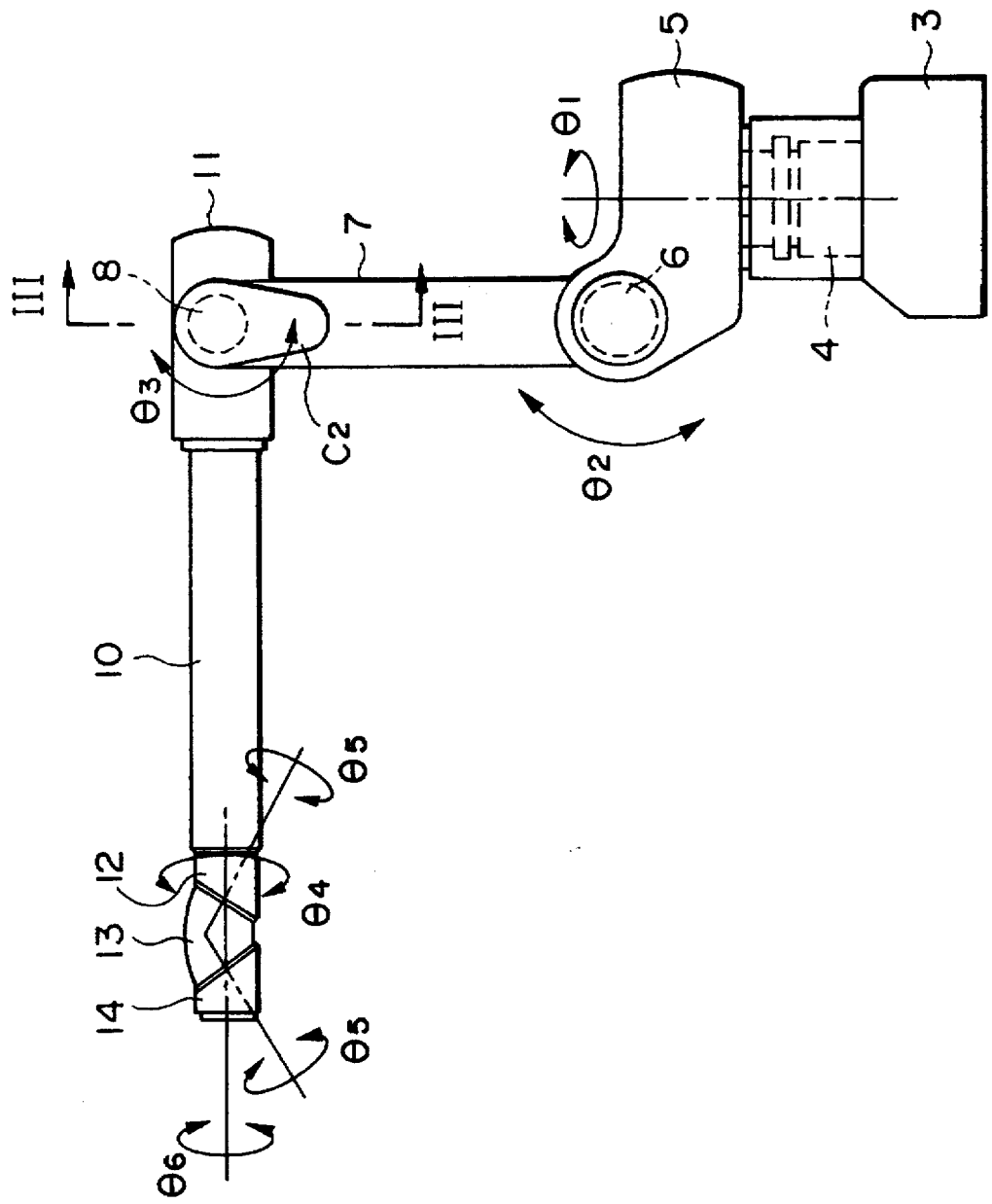
FIG. 2 is a side view of the main body of the first embodiment of the robotic device.

As illustrated in FIG. 2, the base portion 3 of the robotic device is placed on the floor of a working space, and a geared motor 4 which consists of a motor and a reduction gear unit is placed thereon for operating the first shaft for controlling the motion of a rotative base 5 which is disposed on the output shaft of the geared motor 4 and is designed to rotate through an angle $\theta 1$.

The rotative base 5 houses a geared motor 6 which consists of a motor and a reduction gear unit in its interior space for operating a second shaft which controls the motion of the first arm 7 disposed on top of the rotative base 5 through an angle $\theta 2$. A geared motor 8 which consists of a motor 8-2 and a reduction gear unit 8-1 for a third shaft which is disposed at the upper end of the first arm 7 is designed to operate a second arm 10 attached to the first arm 7 through an angle $\theta 3$. The first arm 7 means an arm which is arranged in a manipulator 1 closer to the base 5 than any other arms. The second arm 10 means an arm which makes a joint with the first arm 7 and is located farther from the base 5 than the first arm 7. In the interior space 11 at the tail 11 end of the second arm 10, there are disposed a wrist/motor speed reducer units (not shown) for/of wrist which controls the motions of the wrist sections 12, 13 and 14 through respective angles $\theta 4$, $\theta 5$ and $\theta 6$. The geared motor 6 for the second shaft provides the rotational force for the first arm 7, and the geared motors 4, 6 and 8 provide the rotational force for the wrist sections 12, 13 and 14.

The details of the operation of the articulating elbow-joint in the first embodiment will be explained with reference to FIG. 3.

Figure 3:
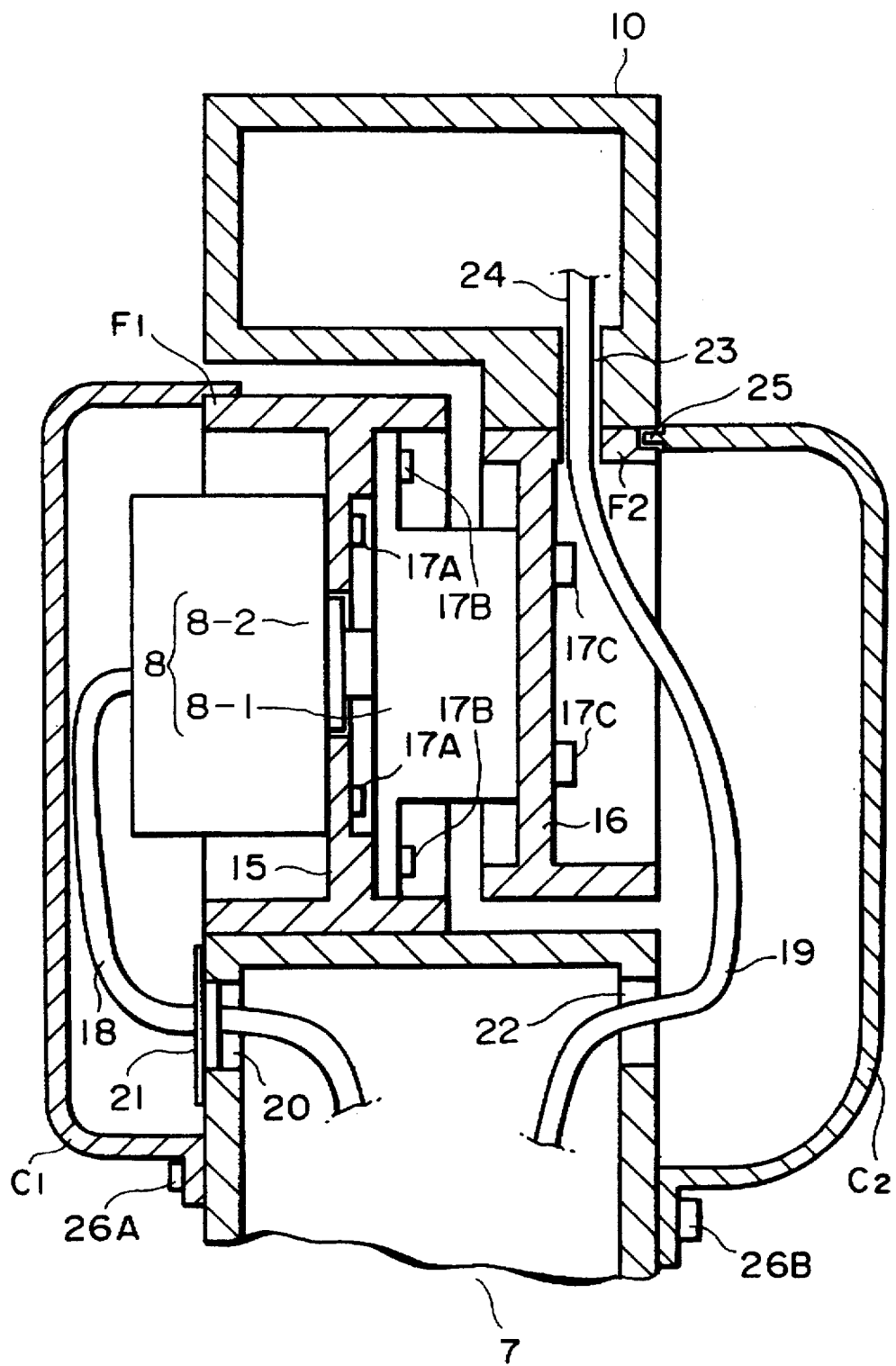
FIG. 3 is an enlarged view of a section through a plane at III—III in FIG. 2.

The joint assembly shown in FIG. 3 is comprised of the end sections of the first arm 7 and the second arm 10, which are connected so as to be free to rotate relative to each other.

The joint assembly includes a third shaft motor or electrical driving means 8-2 for operating the third shaft to rotate the second arm 10, and the output shaft of the third shaft motor 8-2 is coaxially connected, through a first flange member 15, to the reduction gear unit 8-1 for the third shaft.

The first flange member 15 is disposed within the interior space of a frame housing F1 which houses the third shaft motor 8-2 and the reduction gear unit 8-1, both for controlling the motion of the third shaft. The bottom end of the frame housing F1 is fixed to the leading end (away from rotation base 5) of the first arm 7.

The output shaft of the reduction gear unit 8-1 for the third shaft is attached to a second flange member 16 supported on the inside of a frame housing F2 acting as a connection section for the output shaft. The frame housing F2 is fixed to the tail end (close to the rotation base 5) of the second arm 10, and transmits the rotational force from the reduction gear unit 8-1 to the second arm 10.

The sizes of the frame housings F1 and F2 are chosen such that each housing partially overlaps the other so that the elbow mechanisms (8) are almost entirely confined within the cross sectional areas of the first arm 7 and the second arm 10. Only a portion of the third axis drive motor 8-2 is jutting out slightly. When the third shaft motor 8-2 is operated, the reduction gear unit 8-1 for the third shaft is rotated, causing the second flange member 16 which is connected to the reduction gear unit 8-1 to be rotated, thereby providing a rotational power to rotate the second arm 10.

Figure 4:
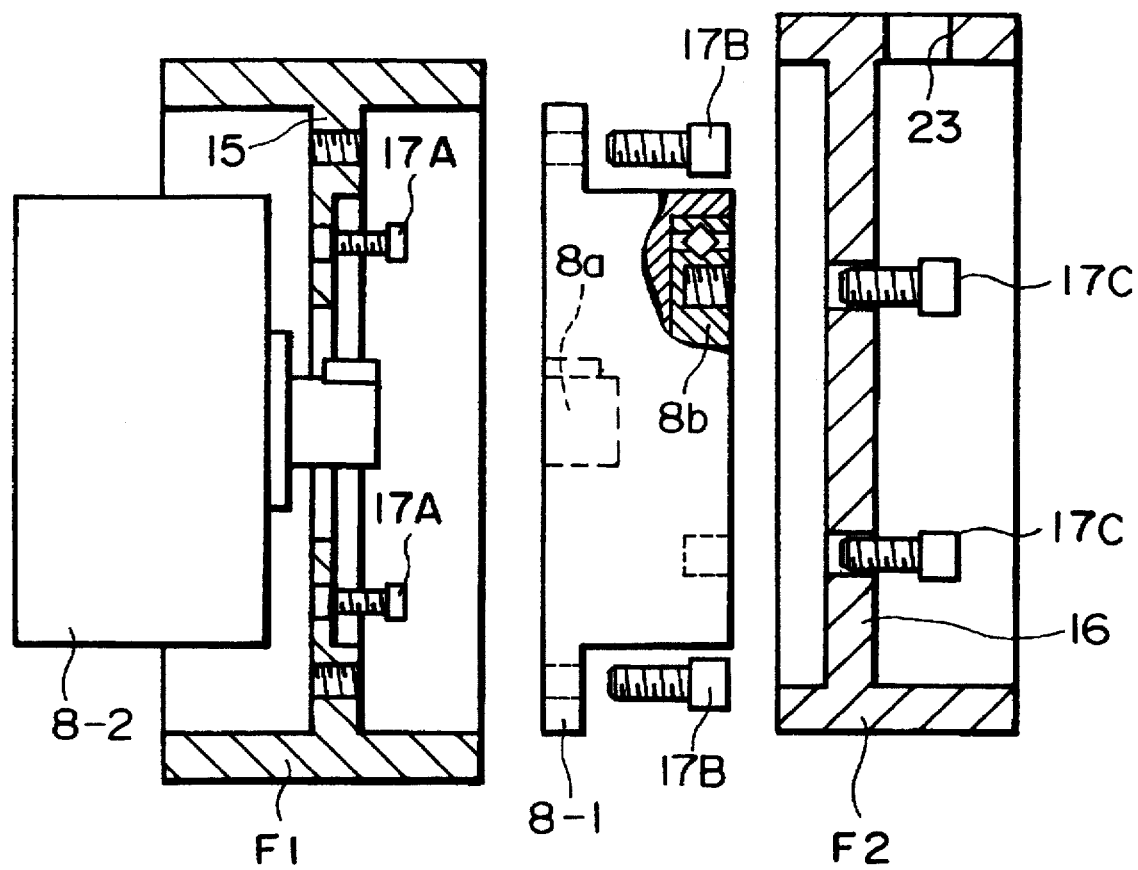
FIG. 4 is a detailed view of the separate parts shown in FIG. 3.

Assembling of the joint section illustrated in FIG. 4 is performed according to the steps outlined below.

(1) The motor 8-2 for operating the third shaft is attached to the first flange member 15 by means of fasteners 17A. The reduction gear unit 8-1 for the third shaft is also attached to the first flange member 15 by means of fasteners 17B.

(2) The output shaft of the motor 8-2 which has been connected to the first flange member 15 is now connected to the input shaft 8a of the reduction gear unit 8-1 for the third shaft by means of a keyed lock.

(3) The output shaft 8b of the reduction gear unit 8-1 is connected by means of fasteners 17c the second flange member 16.

Next, the wiring system and the cover members for the protection of the cables and wires in the joint section of the painting robot will be explained.

Within the interior space of the first arm 7, there are disposed a cable 18 for electrically connecting the motor 8-2 for the third shaft to an electrical source, and a cable 19 of the geared motor 8-2 and an electrical power cable, for detection of the orientation of the manipulator body 1, to its controller.

The cable 18 is first led out of the interior space of the first arm 7 through a feed-through hole 20 provided on the side wall of the first arm 7, and is then connected to the motor 8-2 for the third shaft. At the leading end of the first arm 7, there is attached a cover member C1 which protects the side portion of the frame housing F1 by means of fasteners 26A so as to provide shielding to the bottom section of the motor 8-2. The feed-through hole 20 for the first arm 7 is provided with a sealing cap 21 made of plastic. The cap member 21 fits inside the feed-through hole 20, and serves to support the cable 18 as well as to provide sealing between the interior spaces of the first arm 7 and the cover member C1.

The cable 19 is first led out of a feed-through hole 22 provided on another region of the side wall of the first arm 7, and is then inserted into the interior space of the second arm 10 through a feed-through hole 23 of the frame housing F2 and the feed-through hole 24 of the second arm 10. The exposed section of cable 19 between the feed-through holes 22, 23 and cable 24 is guarded by the cover member C2. The cover member C2 is attached to the leading end of the first arm 7 by means of fasteners 26B. The interior space between the cover member C2 and the second arm 10 is made as a labyrinth structure 27 to provide sealing of the interior space of the cover member C2 (including the interior spaces of the first arm 7 and the second arm 10) from the exterior atmosphere (the ambient environment of the robotic device).

The painting robotic device having the structural features described above presents the following advantages. The articulation design has been simplified by connecting the first arm 7 and the second arm 10 through frame housings F1 and F2 which share a common area of the cross sections of the arms 7, 10. By providing a cover member C1, the exposed portion of the cable 18 which is led out of the first arm 7 is guarded against the adhesion of paints and the consequent degradation of the cable insulation, caused by such factors as sheath material dissolution and hardening of the paints adhered thereon.

The slack in the cable 19, which is produced by leading the cable 19 out of the first arm 7 and re-inserting into the second arm 10, is able to respond to the larger deformation required of the outer bend of the articulation joint while being guarded by the cover member C2 which provide protection from the adhesion of paint materials.

Both cover member C1, C2 are attached to the upper end of the first arm 7, and therefore the additional weight increases the loading factor for the driving motor for the first arm 7 (i.e. the motor for the second shaft) but it does not affect inertial loading of the driving motor 8-2 for the third shaft thereby avoiding to add inertia to the movement of the critical second arm 10. The labyrinth seal structure 25 provided between the cover member C2 and the second arm 10 performs the function of sealing without increasing the frictional forces between the contacting surfaces, and even though the relative orientation of the robotic device may change by the motion of the robot, articulation action can be maintained while providing a high degree of sealing.

Figure 5:
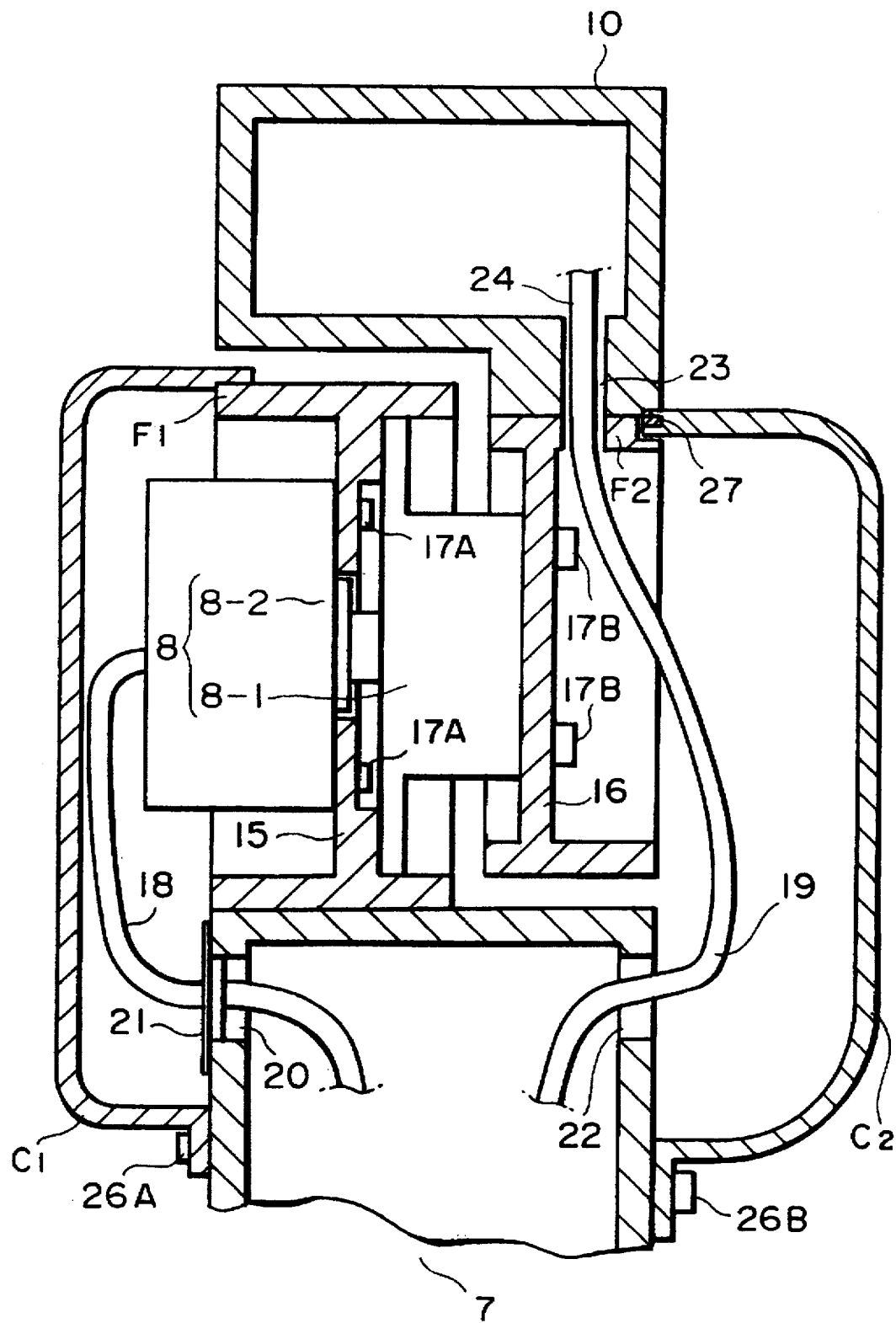
FIG. 5 is a side view of the section shown in FIG. 3 adapted in a second embodiment of the robotic device of the present invention.

A second embodiment of the robotic device will be explained with reference to FIG. 5. In this embodiment, instead of the labyrinth structure 25 provided between the cover C2 and the second arm 10 in the first embodiment, an easily deformable seal member 27, such as a felt material offering a low sliding friction, is utilized. The sealing structure between the cover member C2 and the second arm 10 is not limited to a labyrinth structure, and it is permissible to employ an elastic member having a sliding sealing surface. The felt material for sealing is resistant to paints and organic solvents and therefore offers a superior service life than resins such as rubbers used commonly as a sealing material.

The application of the robotic device illustrated in the present invention is not restricted to those used for painting, and it is obvious that the invention is applicable to other types of industrial robotic devices which may be installed near a painting facility or other robotic devices which are used in an environment filled with vapors from paints and organic solvents

What is claimed is:

1. An industrial robotic means for performing tasks under command comprising a freely rotatable first arm having an electrical driving means disposed at one end for driving a second arm, one end of said second arm being freely rotatably coupled to said first arm; wherein said electrical driving means is supported by a first hollow frame housing which projects from said one end of the first arm, and said second arm is coupled to an output shaft of a reduction gear unit, which is driven by said electrical driving means, through a second hollow frame housing, said second hollow frame housing projects from said one end of said second arm and is overlapped with said first hollow frame housing; wherein the industrial robotic means also comprises:

a first flange which is arranged inside of the first hollow frame housing axially to the electrical driving means in order to support the electrical driving means; and, a second flange which is arranged inside of the second hollow frame housing axially to the electrical driving means and is spaced from the first flange in an axial direction, said reduction gear unit being disposed between said first and second flanges.

2. An industrial robotic means as claimed in claim 1, wherein said one end of the first arm and said one end of the second arm are provided with respective feed-through holes for inserting cables and wires into interior spaces of said first arm and said second arm, and each of said first arm and said second arm is provided with a cover member, for guarding said cables and wires disposed on exterior spaces of said first arm and said second arm, which is supported on either said first arm or said second arm by way of a sealing means.

3. An industrial robotic means as claimed in claim 1, wherein said first arm is an arm which is arranged in said industrial robotic means proximal to a base of said industrial robotic means and said second arm is arranged in said industrial robotic means distal to the base of said industrial robotic means.

4. An industrial robotic means as claimed in claim 2, wherein said first arm is an arm which is arranged in said industrial robotic means proximal to a base of said industrial robotic means and said second arm is arranged in said industrial robotic means distal to the base of said industrial robotic means.

5. An industrial robotic means as claimed in claim 2, wherein said cover member is supported on said first arm and said sealing means is provided between said cover member and said second arm.

6. An industrial robotic means as claimed in claim 4, wherein said cover member is supported on said first arm and said sealing means is provided between said cover member and said second arm.

7. An industrial robotic means as claimed in claim 2, wherein said cover member is supported on one of said first and second arms which is located closer to a base section of said robotic means.

8. An industrial robotic means as claimed in claim 4, wherein said cover member is supported on one of said first and second arms which is located closer to a base section of said robotic means.

9. An industrial robotic means as claimed in claim 2, wherein said sealing means is a labyrinth packing.

10. An industrial robotic means as claimed in claim 4, wherein said sealing means is a labyrinth packing.

11. An industrial robotic means as claimed in claim 5, wherein said sealing means is a labyrinth packing.

12. An industrial robotic means as claimed in claim 7, wherein said sealing means is a labyrinth packing.

13. An industrial robotic means as claimed in claim 2, wherein said sealing means is a felt material fixedly disposed on said first arm so as to slide against said second arm.

14. An industrial robotic means as claimed in claim 4, wherein said sealing means is a felt material fixedly disposed on said first arm so as to slide against said second arm.

15. An industrial robotic means as claimed in claim 5, wherein said sealing means is a felt material fixedly disposed on said first arm so as to slide against said second arm.

16. An industrial robotic means as claimed in claim 7, wherein said sealing means is a felt material fixedly disposed on said first arm so as to slide against said second arm.

17. An industrial robotic means as claimed in claim 2, wherein said second arm is utilized for operating a spraying means for applying a fluid material to a work object.

18. An industrial robotic means as claimed in claim 4, wherein said second arm is utilized for operating a spraying means for applying a fluid material to a work object.

19. An industrial robotic means as claimed in claim 2, wherein said robotic means is positioned in a vicinity of a painting robotic means.

20. An industrial robotic means as claimed in claim 4, wherein said robotic means is positioned in a vicinity of a painting robotic means.

21. An industrial robotic means as claimed in claim 1, wherein said first hollow frame housing has an H-shape in cross section including an axle of said electric drive means.

* * * * *